United States Patent Office 3,284,535
Patented Nov. 8, 1966

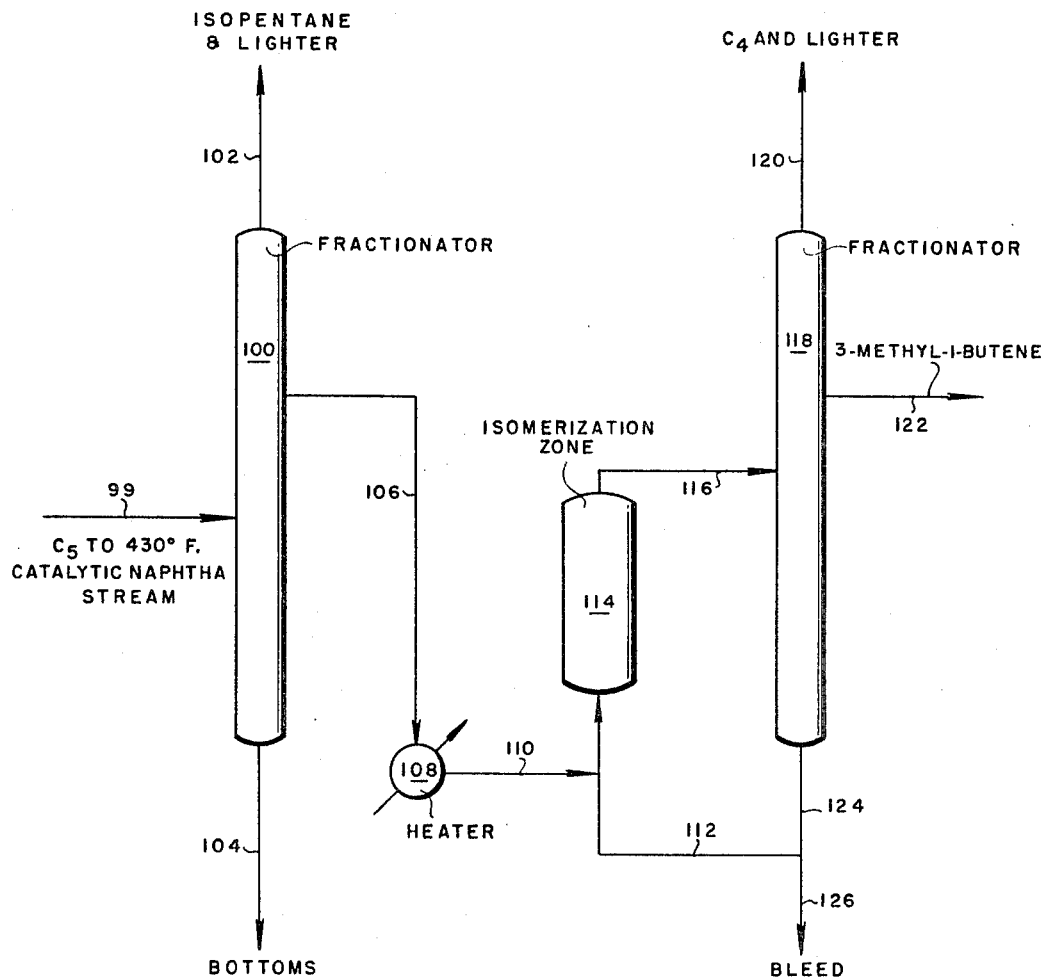

3,284,535
PRODUCTION OF 3-METHYL-1-BUTENE
William R. Edwards, Robert D. Wesselhoft, and Willard N. Mitchell, Baytown, Tex., assignors, by mesne assignments, to Esso Research and Engineering Company, Elizabeth, N.J., a corporation of Delaware
Filed May 10, 1963, Ser. No. 279,357
4 Claims. (Cl. 260—683.2)

The present invention relates to the production of 3-methyl-1-butene from catalytic naphtha. More particularly, it relates to the production of 3-methyl-1-butene from isomers thereof which are present in catalytic naphtha by a process which economically yields 3-methyl-1-butene in high purity without expensive aftertreatment.

High purity 3-methyl-1-butene currently may be obtained by fractionation and purification of catalytic naphtha to recover the 3-methyl-1-butene which is present therein. However, this purification process involves a number of steps, such as contacting the 3-methyl-1-butene with molecular sieves, and is expensive.

The amount of 3-methyl-1-butene recoverable from catalytic naphtha by currently known processes is limited by the amount of catalytic cracking activity. Based on normal catalytic cracking operations, only about 12 barrels of 3-methyl-1-butene are produced for every 10,000 barrels of feed charged to the catalytic cracker. Further, the recovery of 3-methyl-1-butene involves the use of very large fractionation and recovery facilities, which adds to the difficulty and expense in recovering a high purity 3-methyl-1-butene product.

The present invention provides a process whereby large amounts of 3-methyl-1-butene may be produced from catalytic naphtha, while minimizing the fractionation facilities required and providing an economical method of producing 3-methyl-1-butene of the highest purity.

The present invention may be briefly described as fractionating a $C_5$ to 430° F. catalytic naphtha in order to obtain a heart cut which contains compounds boiling from pentene-1 through 2-methylbutene-2. Almost all of the included compounds may be isomerized to 3-methyl-1-butene and are therefore termed "precursors" of 3-methyl-1-butene. This heart cut is isomerized over an acid catalyst in order to obtain roughly thermal equilibrium amounts of 3-methyl-1-butene, which is separated and recovered from the isomerized product. The precursors of 3-methyl-1-butene in the product stream may be recycled virtually to extinction, only a small amount of purge being required. Thus, from 50% to 75% yield of 3-methyl-1-butene (based on the catalytic naphtha heart cut) may be recovered, as compared to only about 3% in the $C_5$ portion of the catalytic naphtha. Allowing for the relative volumes of the two streams, this indicates a recovery of 10 to 15 times as much 3-methyl-1-butene by the present invention as could be recovered by known processes.

The catalytic naphtha feedstock of the present invention is obtained by catalytically cracking hydrocarbons over a catalytic cracking catalyst, such as silica-alumina, at a temperature of about 900° F. to 975° F., either in a fixed bed or in a transfer line reactor. The reaction product is fractionated and a debutanized, olefin-containing stream boiling from $C_5$ through 430° F. is recovered. This catalytic naphtha stream provides the feed material for the present invention.

An exemplary catalytic naphtha boiling from $C_5$ through 430° F. may contain the following lower boiling compounds:

TABLE I

| Compound: | Boiling point, ° F. |
|---|---|
| 3-methyl-1-butene | 68 |
| 1,4-pentadiene | 79 |
| Isopentane | 82 |
| Pentene-1 | 86 |
| 2-methyl-1-butene | 88 |
| Pentene-2 | 97 |
| n-pentane | 97 |
| 2-methyl-2-butene | 101 |

Note that both isopentane and 1,4-pentadiene have higher boiling points than 3-methyl-1-butene, so that it is necessary to remove the 3-methyl-1-butene along with the isopentane and 1,4-pentadiene. It has been found that the 3-methyl-1-butene produced by the present invention is superior to that removed in the first step, since no 1,4-pentadiene is present in the isomerized product.

The first fractionation may be accomplished in one step or as part of the usual depentanization of catalytic naphtha, wherein the butanes and then the pentane hydrocarbons are removed from the total catalytic naphtha stream. By either expedient, a catalytic naphtha feedstock to the first fractionator is obtained, from whence a heart cut is obtained which consists essentially of pentene-1, 2-methyl-1-butene, pentene-2, n-pentane, and 2-methyl-2-butene. Each of these materials is a precursor of 3-methyl-1-butene. Some isopentane may be tolerated in the heart cut, as is hereinafter more clearly set forth.

In the first fractionation step, isopentane is selectively removed overhead, as little as possible of the isopentane being carried over into the heart cut. In removing the isopentane, 3-methyl-1-butene which occurs in the catalytic naphtha will also pass overhead and be lost from the charge stock. The isopentane must be substantially removed even though this results in the loss of the 3-methyl-1-butene, since the isopentane may comprise 30 mol percent of the $C_5$ fraction of the catalytic naphtha. This large amount of isopentane would make it impossible to use a desirably high recycle ratio in the isomerization zone, since it would tend to build up and (since isopentane is not a precursor of 3-methyl-1-butene) its diluent effect eventually would cause the reaction to become inoperable. Also, by removing the isopentane as an overhead stream, 1,4-pentadiene is removed from the feedstock. In addition, removal of the isopentane from the isomerization feed greatly simplifies the distillation required to recover 3-methyl-1-butene from the isomerization product. The 3-methyl-1-butene produced by isomerization is thus recovered as a final product, uncontaminated with this diolefin. Where the 3-methyl-1-butene is intended for certain purposes, such as polymerization, the complete exclusion of 1,4-pentadiene is necessary.

Since commercial scale fractionation facilities usually do not make a precise component separation, a certain amount of the isopentane may be carried over into the heart cut. Up to about 5 mol percent of isopentane may be tolerated in the heart cut, if the purge stream from the isomerization recycle line is adjusted to account for the isopentane which is carried into the isomerization zone with the feedstock. In effect, the more isopentane in the heart cut, the higher the purge rate, the lower the recycle ratio to the isomerization zone, and the more expensive the product fractionation. 1,4-pentadiene, however, is rigorously excluded from the feedstock since this product would not be separable from the 3-methylbutene-1 product, at least to the extent required in producing a polymerization grade 3-methyl-1-butene.

In the isomerization zone, the heart cut is contacted with a solid acidic catalyst such as a cracking catalyst. Cracking catalysts which are suitable for use would include the 3A silica-alumina catalyst, silica gel, and alumina.

The isomerization is accomplished at a temperature within the range of about 600° F. to about 1200° F., from 800° F. to 1000° F. having been found to be preferable. The pressure in general is immaterial and may be carried out either at atmospheric, subatmospheric, or superatmospheric pressures. It is preferred to operate in the range of atmospheric pressure, however. The space velocity may range from about 5 to about 25 v./v./hr., a preferred range being from 8 to 15 v./v./hr. Residence time may range from 0.2 second to 1.2 seconds.

The isomerized product from the isomerization zone will contain 3-methyl-1-butene in amounts approaching the thermal equilibrium values thereof.

The isomerized product is passed from the isomerization zone through requisite heat exchangers and coolers and is charged into a final fractionator wherein the isomerized product is separated into a 3-methyl-1-butene product stream, a $C_4$ and lighter product stream (which represents the light products of cracking in the isomerization zone), and a bottoms stream which is recycled to the isomerization zone in order to obtain a conversion of 50% to 75% to 3-methyl-1-butene, based on the hydrocarbons charged. A portion of this recycle stream may be bled from the system in order to prevent the build-up of diluents in the isomerization zone.

All of this may be more clearly understood by reference to the drawing wherein a preferred mode of practicing the present invention is set forth.

Referring now to the drawing, a $C_5$ to 430° F. catalytic naphtha stream, which comprises 3-methyl-1-butene, isopentane, pentene-1, 2-methyl-1-butene, pentene-2, 2-methyl-2-butene, and n-pentane, is charged by way of line 99 into a fractionator 100. Isopentane and lighter materials are taken off overhead by way of line 102, while materials heavier than 2-methyl-2-butene are taken off as a bottoms stream through line 104. The 1,4-pentadiene-free heart cut consisting essentially of 1-pentene, 2-methyl-1-butene, 2-pentene, n-pentane, and 2-methyl-2-butene is removed as a side-stream from the tower by way of line 106 and is passed through a heater 108 where the temperature is raised to about 925° F.

The heart cut feedstock to the isomerization zone is then passed by way of line 110 and contacted with a recycle stream introduced by way of line 112, to be introduced into the isomerization zone 114. Within the isomerization zone, the admixture of heart cut and recycle stock is contacted with an acid catalyst such as a 3A cracking catalyst at about 925° F. for about 0.4 second. The space velocity may be about 13 v./v./hr.

From the isomerization zone 114, an isomerized product is withdrawn by way of line 116 and introduced into the second fractionator 118.

From the second fractionator 118, the cracking fragments from the isomerization zone are removed as $C_4$ and lighter materials through line 120, while 3-methyl-1-butene is removed as a substantially pure product stream by way of line 122. The bottoms stream from the fractionator 118 comprises 3-methyl-1-butene precursors plus the isopentane, if any, which have been carried through the system. This bottoms stream is discharged by way of line 124, and a bleed stream removed by way of line 126. The recycle stream is carried from line 124 back into contact with the catalyst in the isomerization zone by line 112.

Thus, it is apparent that the present invention provides a simple and economical method of producing high purity 3-methyl-1-butene with an ultimate recovery of 50% to 75%, based on the heart cut feedstock to the isomerization zone.

More than ten times the amount of 3-methyl-1-butene present in catalytic naphtha may be produced by converting 3-methyl-1-butene precursors into 3-methyl-1-butene, recycling the precursors to the isomerization zone to obtain 50% to 75% conversion thereof.

It is to be noted that by the practice of the present invention, wherein the large amounts of isopentane present in the catalytic naphtha feedstock are discarded before isomerization, the final fractionation facilities are only about one-third the size of that required if 3-methyl-1-butene is to be recovered as a naturally occurring product stream. Further, the expensive aftertreatment of the 3-methyl-1-butene (e.g., contacting with molecular sieves) is avoided by the practice of the present invention, and a polymerization grade product is obtained as the final product.

As exemplary of the present invention, a number of runs were made.

*Example 1*

A $C_5$ to 430° F. catalytic naphtha was debutanized and then depentanized. The second step yielded a $C_5$ fraction which was then charged to a first-stage fractionator. A heart cut in accordance with the present invention was obtained, and this heart cut was isomerized over 3A silica-alumina catalyst at a temperature of 900° F. and a pressure of 0 p.s.i.g. The residence time was about 0.4 second, the space velocity being about 13.0 v./v./hr. The isomerized product was fractionated in order to recover a product stream containing 3-methyl-1-butene.

The results are summarized in the table below.

TABLE II

| | $C_5$'s Cat. Naphtha Feed, Mol Percent | Isomerization | |
|---|---|---|---|
| | | Feed, Mol Percent | Product, Mol Percent |
| $C_4$'s | 0 | 0 | 2.2 |
| 3-Methyl-1-butene | 3.5 | 0.3 | 3.1 |
| Isopentane | 26.8 | 3.9 | 5.2 |
| 1,4-Pentadiene | 0.2 | 0 | 0 |
| Pentene-1 | 5.0 | 2.6 | 5.5 |
| 2-Methyl-1-butene | 15.0 | 7.5 | 17.8 |
| Trans-2-pentene | 15.0 | 21.1 | 16.3 |
| Cis-2-pentene | 7.5 | 13.2 | 8.8 |
| 2-Methyl-2-butene | 23.0 | 46.7 | 36.0 |
| n-Pentane | 4.0 | 4.7 | 5.1 |
| | 100.0 | 100.0 | 100.0 |

*Example 2*

A run similar to Example 1 was made at 975° F. rather than 900° F. The heart cut was contacted with 3A silica-alumina catalyst at 975° F., 0 p.s.i., space velocity of 13.8 v./v./hr., and a residence time of 0.4 second. The product from the isomerization zone had the following composition:

TABLE III

| | Mol, percent |
|---|---|
| $C_4$'s | 0.6 |
| 3-methyl-1-butene | 3.0 |
| Isopentane | 3.8 |
| n-Pentane | 5.2 |
| Pentene-1 | 6.3 |
| 2-methyl-1-butene | 17.3 |
| Trans-2-pentene | 18.3 |
| Cis-2-pentene | 10.6 |
| 2-methyl-2-butene | 34.9 |
| | 100.0 |

Raising the temperature from 900° F. to 975° F. had no appreciable effect on the product distribution.

Thus, it is seen that the production of 3-methyl-1-butene from catalytic naphtha may be increased by a factor of 10, while economically obtaining a product of high purity.

Having disclosed the essence of our invention and having set forth the preferred modes of practicing it, what is to be covered by Letters Patent should be limited not

We claim:
1. A method of optimizing the production of high purity 3-methyl-1-butene from catalytic naphtha which comprises fractionating said catalytic naphtha to exclude isopentane and lighter compounds and compounds heavier than 2-methyl-2-butene, whereby a heart cut is obtained consisting essentially of pentene-1, 2-methyl-1-butene, pentene-2, normal pentane, and 2-methyl-2-butene, each of which is a precursor of 3-methyl-1-butene, contacting said heart cut in an isomerization zone with a silica-alumina cracking catayst at a temperature of 800° F. to 1000° F. and a space velocity of 5 to 25 v./v./hr. to obtain an isomerized product stream containing more 3-methyl-1-butene than was contained in said heart cut, fractionating said isomerized product stream to obtain a 3-methyl-1-butene stream and a recycle stream, recovering said 3-methyl-1-butene, and recycling said recycle stream to said isomerization zone.

2. A method of optimizing the production of high purity 3-methyl-1-butene from catalytic naphta which comprises fractionating said catalytic naphtha to obtain a heart cut consisting essentially of pentene-1, 2-methyl-1-butene, pentene-2, n-pentane, and 2-methyl-2-butene, each of which is a precursor of 3-methyl-1-butene, and containing less than 5% isopentane, and being free of 1,4-pentadiene, contacting said heart cut in an isomerization zone with a silica-alumina cracking catalyst at a temperature of 800° F. to 1000° F. and a space velocity of 5 to 25 v./v./hr. to obtain an isomerized product stream containing more 3-methyl-1-butene than was contained in said heart cut, fractionating said isomerized product stream to obtain a 3-methyl-1-butene stream and a recycle stream, recovering said 3-methyl-1-butene, and recycling at least a portion of said recycle stream to said isomerization zone.

3. A method of optimizing the production of high purity 3-methyl-1-butene from catalytic naphtha which comprises fractionating said catalytic naphtha to obtain a heart cut consisting essentially of pentene-1, 2-methyl-1-butene, pentene-2, n-pentane, and 2-methyl-2-butene, each of which is a precursor of 3-methyl-1-butene, and isopentane being present in amounts less than 5.0%, contacting said heart cut in an isomerization zone with an acidic cracking catalyst at a temperature of 800° F. to 1000° F. and a space velocity of 5 to 25 v./v./hr. to obtain an isomerized product stream containing more 3-methyl-1-butene than was contained in said heart cut, fractionating said isomerized product stream to obtain a 3-methyl-1-butene stream and a recycle stream, and recyling at least a portion of said recycle stream to said isomerization zone.

4. A method of optimizing the production of high purity 3-methyl-1-butene from catalytic naphtha which comprises fractionating said catalytic naphtha to obtain a heart cut consisting essentially of pentene-1, 2-methyl-1-butene, pentene-2, n-pentane, and 2-methyl-2-butene, each of which is a precursor of 3-methyl-1-butene, contacting said heart cut in an isomerization zone with an acidic cracking catalyst under isomerization conditions to obtain an isomerized product stream containing more 3-methyl-1-butene than was contained in said heart cut, fractionating said isomerized product stream to obtain a 3-methyl-1-butene stream and a recycle stream, and recycling at least a portion of said recycle stream to said isomerization zone.

References Cited by the Examiner

UNITED STATES PATENTS

| | | | |
|---|---|---|---|
| 2,463,873 | 3/1949 | Heinrich | 260—683.2 |
| 2,900,425 | 8/1959 | Bloch et al. | 260—683.75 |
| 3,173,968 | 3/1965 | Edwards et al. | 260—683.2 |

OTHER REFERENCES

Ewell et al.: "Isomerization Equilibrium Among the Branched Chain Pentenes," Journal of the American Chemical Society, vol. 63, pp. 3460–3465, 1941.

Oblad et al.: Isomerization of 1- and 2-Pentenes, Industrial & Engineering Chemistry, vol. 39, No. 11, November 1947, pp. 1462–1466.

DELBERT E. GANTZ, *Primary Examiner.*

R. H. SHUBERT, *Assistant Examiner.*